(12) United States Patent
Kagimoto et al.

(10) Patent No.: US 7,991,404 B2
(45) Date of Patent: Aug. 2, 2011

(54) CONGESTION CONTROL METHOD AND DEVICE IN MOBILE COMMUNICATION NETWORK

(75) Inventors: Tomonari Kagimoto, Fukuoka (JP); Hitoshi Ebihara, Fukuoka (JP); Wataru Kawaguchi, Fukuoka (JP); Kusuo Yonezawa, Fukuoka (JP); Koichi Yamamoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 979 days.

(21) Appl. No.: 11/902,856

(22) Filed: Sep. 26, 2007

(65) Prior Publication Data
US 2008/0102853 A1    May 1, 2008

(30) Foreign Application Priority Data
Oct. 31, 2006 (JP) .................. 2006-296790

(51) Int. Cl.
*H04W 72/00* (2009.01)
(52) U.S. Cl. ........ 455/453; 455/436; 455/437; 455/438; 455/439
(58) Field of Classification Search .................. 455/453, 455/435.2–435.3, 436–439; 370/329
See application file for complete search history.

(56) References Cited

U.S. PATENT DOCUMENTS

| | | | | |
|---|---|---|---|---|
| 5,454,026 A * | 9/1995 | Tanaka | ........................... | 455/437 |
| 6,069,871 A * | 5/2000 | Sharma et al. | ................. | 370/209 |
| 6,366,780 B1 * | 4/2002 | Obhan | ........................... | 455/453 |
| 6,385,449 B2 * | 5/2002 | Eriksson et al. | .............. | 455/436 |
| 6,985,740 B2 * | 1/2006 | Shyy et al. | ..................... | 455/453 |
| 7,142,868 B1 * | 11/2006 | Broyles et al. | ................ | 455/453 |
| 7,747,256 B2 * | 6/2010 | Hanov et al. | ................ | 455/452.2 |
| 2001/0012778 A1 * | 8/2001 | Eriksson et al. | .............. | 455/436 |
| 2002/0052206 A1 * | 5/2002 | Longoni | ........................ | 455/453 |
| 2002/0072363 A1 * | 6/2002 | Riihinen et al. | .............. | 455/432 |
| 2002/0077112 A1 * | 6/2002 | McIntosh et al. | ............. | 455/453 |
| 2002/0137518 A1 * | 9/2002 | Achour | ......................... | 455/447 |
| 2002/0173314 A1 * | 11/2002 | Hwang et al. | ................ | 455/453 |

(Continued)

FOREIGN PATENT DOCUMENTS
JP    5-292012    11/1993
(Continued)

OTHER PUBLICATIONS
Japanese Official Communication dated Dec. 7, 2010 for corresponding Japanese application No. 2006-296790.

*Primary Examiner* — Jean Gelin
*Assistant Examiner* — Nathan Taylor
(74) *Attorney, Agent, or Firm* — Murphy & King, P.C.

(57) ABSTRACT

A congestion control method in a mobile communication network includes the steps of recognizing by a base station control unit of the mobile communication network that the base station control unit or a base station or a cell under the same becomes in a congestion state (Yes in #11), determining a destination for a mobile terminal under a cell in the congestion state to get rid of the congestion state (#12), and sending a notice of information of the destination together with congestion information that is information of the congestion state, based on control performed by the base station control unit, to the base station control unit or the base station under the same in the congestion state or a mobile terminal that is located in the cell under the base station control unit, so that a user of the mobile terminal can recognize the congestion state (#13 and #14).

8 Claims, 15 Drawing Sheets

U.S. PATENT DOCUMENTS

| | | | |
|---|---|---|---|
| 2004/0029592 A1* | 2/2004 | Shyy et al. | 455/453 |
| 2004/0053630 A1* | 3/2004 | Ramos et al. | 455/500 |
| 2004/0087311 A1* | 5/2004 | Haglund | 455/453 |
| 2005/0164709 A1* | 7/2005 | Balasubramanian et al. | 455/453 |
| 2006/0148485 A1* | 7/2006 | Kangas et al. | 455/453 |

FOREIGN PATENT DOCUMENTS

| | | |
|---|---|---|
| JP | 2005327598 | 12/1993 |
| JP | 11-275646 | 10/1999 |
| JP | 2000224657 | 8/2000 |
| JP | 2002112302 | 4/2002 |

* cited by examiner

| CELL NUMBER (CB) | CONGESTION STATE (FH) | PRIORITY (YD) |
| --- | --- | --- |
| a | 1 | |
| b | 1 | |
| c | 1 | |
| d | 0 | 1 |
| e | 0 | 2 |
| f | 0 | 3 |
| g | 0 | 4 |

| CELL NUMBER | DISPLAY NAME |
|---|---|
| a | TENJIN 1 CHOME A |
| b | TENJIN 1 CHOME B |
| c | TENJIN 2 CHOME A |
| d | TENJIN 2 CHOME B |
| e | TENJIN 3 CHOME A |
| f | TENJIN 3 CHOME B |
| g | TENJIN 3 CHOME C |

| CELL A | NORMAL |
|--------|--------|
| CELL B | NORMAL |
| CELL C | NORMAL |
| CELL D | NORMAL |
| CELL E | NORMAL |
| CELL F | NORMAL |
| CELL G | NORMAL |

| CELL A | CONGESTION |
| CELL B | CONGESTION |
| CELL C | CONGESTION |
| CELL D | NORMAL |
| CELL E | NORMAL |
| CELL F | NORMAL |
| CELL G | NORMAL |

| CELL A | CONGESTION |
| CELL B | CONGESTION |
| CELL C | CONGESTION |
| CELL D | CONGESTION |
| CELL E | CONGESTION |
| CELL F | NORMAL |
| CELL G | NORMAL |

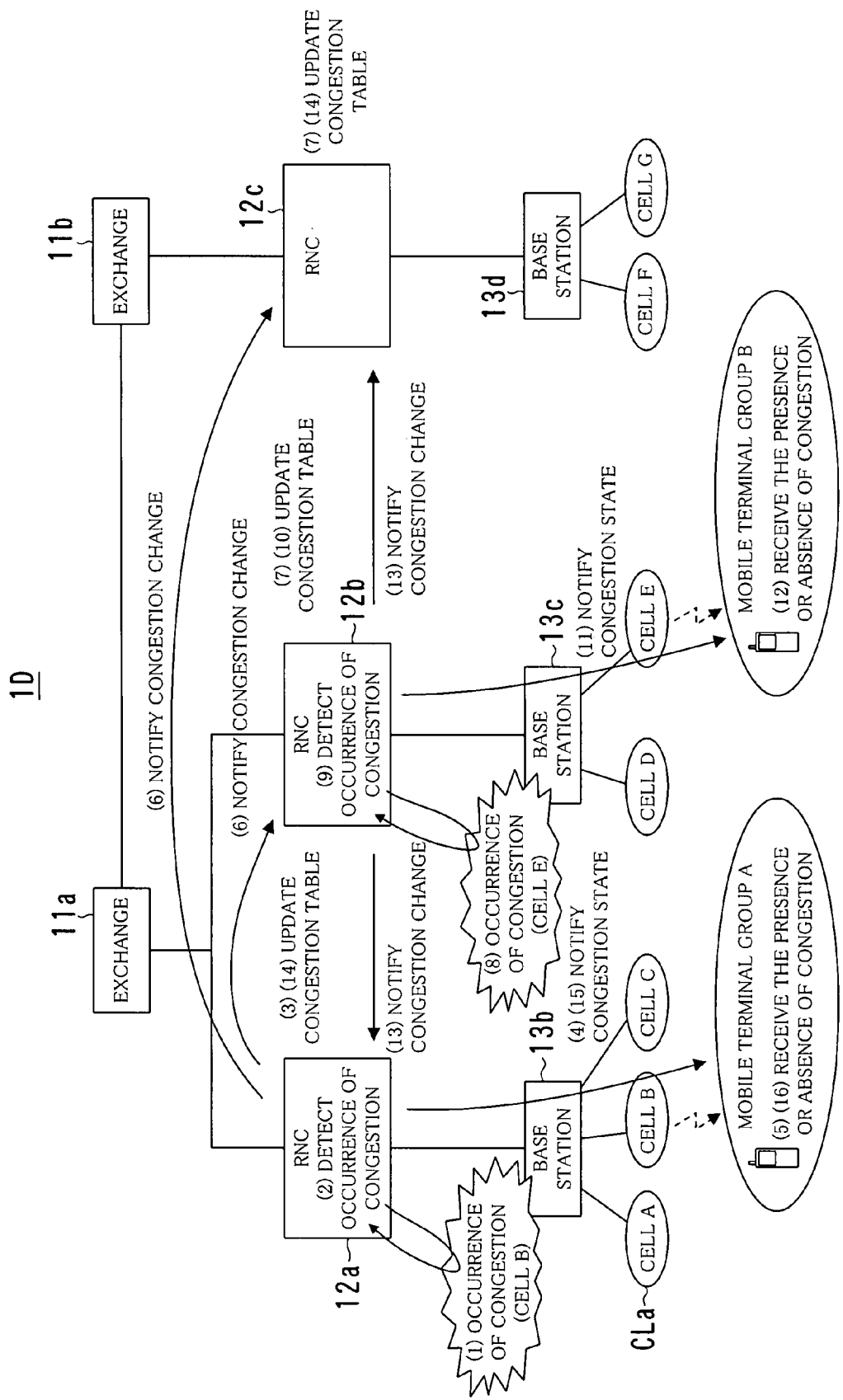

| CELL A | NORMAL |
|--------|--------|
| CELL B | NORMAL |
| CELL C | NORMAL |
| CELL D | NORMAL |
| CELL E | NORMAL |
| CELL F | NORMAL |
| CELL G | NORMAL |

| CELL A | NORMAL |
|--------|--------|
| CELL B | CONGESTION |
| CELL C | NORMAL |
| CELL D | NORMAL |
| CELL E | NORMAL |
| CELL F | NORMAL |
| CELL G | NORMAL |

| CELL A | NORMAL |
|--------|--------|
| CELL B | CONGESTION |
| CELL C | NORMAL |
| CELL D | NORMAL |
| CELL E | CONGESTION |
| CELL F | NORMAL |
| CELL G | NORMAL |

| CELL A | NORMAL |
|--------|--------|
| CELL B | NORMAL |
| CELL C | NORMAL |
| CELL D | NORMAL |
| CELL E | NORMAL |
| CELL F | NORMAL |
| CELL G | NORMAL |

| CELL A | NORMAL |
|--------|--------|
| CELL B | CONGESTION |
| CELL C | NORMAL |
| CELL D | NORMAL |
| CELL E | NORMAL |
| CELL F | NORMAL |
| CELL G | NORMAL |

| CELL A | CONGESTION |
|--------|------------|
| CELL B | CONGESTION |
| CELL C | NORMAL |
| CELL D | NORMAL |
| CELL E | NORMAL |
| CELL F | NORMAL |
| CELL G | NORMAL |

| CELL A | NORMAL |  |
|---|---|---|
| CELL B | NORMAL |  |
| CELL C | NORMAL |  |
| CELL D | NORMAL |  |
| CELL E | NORMAL |  |
| CELL F | NORMAL |  |
| CELL G | NORMAL |  |

| CELL A | NORMAL | 1 |
|---|---|---|
| CELL B | CONGESTION |  |
| CELL C | NORMAL | 2 |
| CELL D | NORMAL | 3 |
| CELL E | NORMAL | 4 |
| CELL F | NORMAL | 5 |
| CELL G | NORMAL | 6 |

| CELL A | CONGESTION |  |
|---|---|---|
| CELL B | CONGESTION |  |
| CELL C | NORMAL | 1 |
| CELL D | NORMAL | 2 |
| CELL E | NORMAL | 3 |
| CELL F | NORMAL | 4 |
| CELL G | NORMAL | 5 |

| CELL A | NORMAL |  |
|---|---|---|
| CELL B | NORMAL |  |
| CELL C | NORMAL |  |
| CELL D | NORMAL |  |
| CELL E | NORMAL |  |
| CELL F | NORMAL |  |
| CELL G | NORMAL |  |

| CELL A | NORMAL | 2 |
|---|---|---|
| CELL B | CONGESTION |  |
| CELL C | NORMAL | 1 |
| CELL D | NORMAL | 3 |
| CELL E | NORMAL | 4 |
| CELL F | NORMAL | 5 |
| CELL G | NORMAL | 6 |

| CELL A | CONGESTION |  |
|---|---|---|
| CELL B | CONGESTION |  |
| CELL C | NORMAL | 2 |
| CELL D | NORMAL | 1 |
| CELL E | NORMAL | 3 |
| CELL F | NORMAL | 4 |
| CELL G | NORMAL | 5 |

CONGESTION CONTROL METHOD AND DEVICE IN MOBILE COMMUNICATION NETWORK

BACKGROUND OF THE INVENTION

1. Field of the Invention

The present invention relates to a congestion control method, a base station control unit and a mobile terminal in a mobile communication network.

2. Description of the Prior Art

Recently, mobile communications using mobile phones (including PHS phones) have become commonplace. A mobile communication network is made up of mobile terminals, wireless base stations, base station control units, exchanges and the like.

As a mobile communication becomes widespread, its traffic increases. If large quantity of calls and receptions are performed with mobile phones or the like in cases where a disaster occurred or an event is held, probability that a specific area will fall into a congestion state may be increased. If a congestion state occurs, calls and receptions as well as e-mail transmission and reception with mobile phones become impossible in the area. In addition, if the congestion state lasts long, the entire system of the mobile communication network will become unstable. In order to avoid such a situation, communications with mobile phones and the like in the area will be restricted if a congestion state occurs, so that the mobile communication network can be stabilized. In this case, with respect to emergency calls and high priority calls, communications or talking can be secured by using emergency wireless resources.

However, an ordinary user who cannot enjoy such a special treatment cannot make communication when a congestion state occurred. There is a case, however, where an ordinary user must make an urgent communication for an important matter. Nonetheless, an ordinary user is in such a state that he or she has just to wait until the congestion state of the mobile communication network will be relieved.

As a congestion control method in a mobile communication network, Japanese unexamined patent publication No. 5-292012 discloses a following method. A network side informs a mobile terminal side of a communication channel use ratio of each base station and a threshold of the use ratio. The mobile terminal side receives the information and determines whether or not a congestion state occurred. If it determines that a congestion state occurred, it requests a hand over in the case where a neighboring wireless communication zone has no problem in its communication quality.

In addition, Japanese unexamined patent publication No. 11-275646 discloses a following method. When the number of times of completing registration of location from a base station becomes a predetermined number or more, a network side distributes the traffic to a neighboring base station if there is not a problem in electric field level and communication channel use rate of the neighboring base station.

However, the above-mentioned method described in Japanese unexamined patent publication No. 5-292012 is a technique dealing with a state after a mobile phone or the like established communication so that the user can communicate with it, and it cannot resolve a trouble in the case where the user cannot communicate due to occurrence of the congestion state.

In addition, the method disclosed in Japanese unexamined patent publication No. 11-275646 is premised on that the registration of location is requested by the mobile phone. However, if a congestion state occurs, it is unable even to request the registration of location. Therefore, it also cannot resolve a trouble in the case where the user cannot communicate due to occurrence of the congestion state.

In addition, there is provided a technique of restricting communications with mobile phones in the area for relieving the congestion state of the network if the mobile communication network is congested, so as to secure network resources for emergency calls or high priority calls.

However, even if this technique is used, an ordinary user has just to wait until the congestion state will be relieved as described above.

In this way, one of the conventional proposed techniques is for avoiding occurrence of a congestion state and the other is for restricting communication when a congestion state occurred. But, they cannot cancel the congestion state promptly when it occurred.

SUMMARY OF THE INVENTION

An object of the present invention is to provide a congestion control method and device as well as a mobile terminal that is used for the method or device, which can cancel the congestion state as soon as possible when it occurred, so that a mobile terminal can make communication.

A method according to one aspect of the present invention, which is a congestion control method in a mobile communication network, includes the steps of recognizing by a base station control unit of the mobile communication network that the base station control unit or a base station under the base station control unit or a cell under the base station control unit becomes in a congestion state, and when the congestion state was recognized, sending a notice to the base station control unit or the base station or a mobile terminal that is located in the cell, which is in the congestion state, about congestion information that is information of the congestion state, based on control performed by the base station control unit, so that a user of the mobile terminal can recognize the congestion state.

A user of the mobile terminal that received the notice can know from the congestion information that the congestion state occurred and can deal with it appropriately so as to get rid of the congestion state.

Preferably, when the notice of the congestion information is sent to the mobile terminal, a message of the notice may be displayed on a screen of the mobile terminal, or an audio output of the notice may be produced from a speaker of the mobile terminal.

Thus, the user of the mobile terminal can recognize the congestion information easily.

In addition, the base station control unit that recognized to be the congestion state may send the notice of the congestion information to other base station control unit in the mobile communication network. The other base station control unit that received the notice may send the received notice of the congestion information to mobile terminals under the other base station control unit, based on controls performed by the other base station control unit, so that users of the mobile terminals can recognize the congestion state.

Thus, the congestion information is notified also to areas neighboring the area in which the congestion state occurred, so that the congestion information is shared in a wide area. Consequently, the congestion information can be used for cancelling the congestion state.

In addition, the base station control unit that recognized to be the congestion state may manage the congestion state by the cell, decide a priority as a destination for a mobile terminal under the cell in the congestion state to move for getting rid of the congestion state with respect to a cell that is not in the congestion state. When the notice of the congestion information is sent to the mobile terminal, information of the destination cell may be notified based on the priority.

Thus, the user in the congestion state can know where to move for getting rid of the congestion state, so that the case where an emergency communication is necessary can be supported. In addition, the mobile communication network can cancel the congestion state in an early stage.

In addition, the mobile terminals to which the notice of the congestion information should be sent are divided into groups, and a priority is decided for each group so that different destinations are assigned to the groups with higher priority. A notice of destinations having different priorities is sent to the mobile terminal of each group.

Thus, users to which the congestion information and the destinations are notified will move and be dispersed to different destinations in accordance with the group to which the user belongs. Consequently, the congestion state can be canceled in an early stage, and it is prevented a new congestion state from occurring in the destination.

In this way, according to the present invention, the base station control unit detects a congestion state, and sends a notice of restriction as congestion information to a user of a mobile terminal such as a mobile phone located in a corresponding area, as well as a notice of a neighboring area where call and reception can be performed. Thus, a user who needs an emergency communication can be led to move to the area where call and reception can be performed.

According to the present invention, when a congestion state occurs, the congestion state can be cancelled as soon as possible so that a mobile terminal can make a communication.

BRIEF DESCRIPTION OF THE DRAWINGS

FIG. 3 is a diagram showing an example of a congestion state management table.

FIG. 5 is a diagram showing an example of a destination corresponding information table.

FIGS. 8A, 8B and 8C are diagrams showing a change in contents of the congestion state management table.

FIG. 10 is a diagram of the whole mobile communication network showing a third example.

FIGS. 11A, 11B and 11C are diagrams showing a change in contents of the congestion state management table.

FIGS. 13A, 13B and 13C are diagrams showing a change in contents of the congestion state management table.

FIGS. 14A-14F are diagrams showing contents of the congestion state management table that is transmitted to two groups.

DESCRIPTION OF THE PREFERRED EMBODIMENTS

The invention will now be described in detail with reference to the attached drawings.

Figure 1:
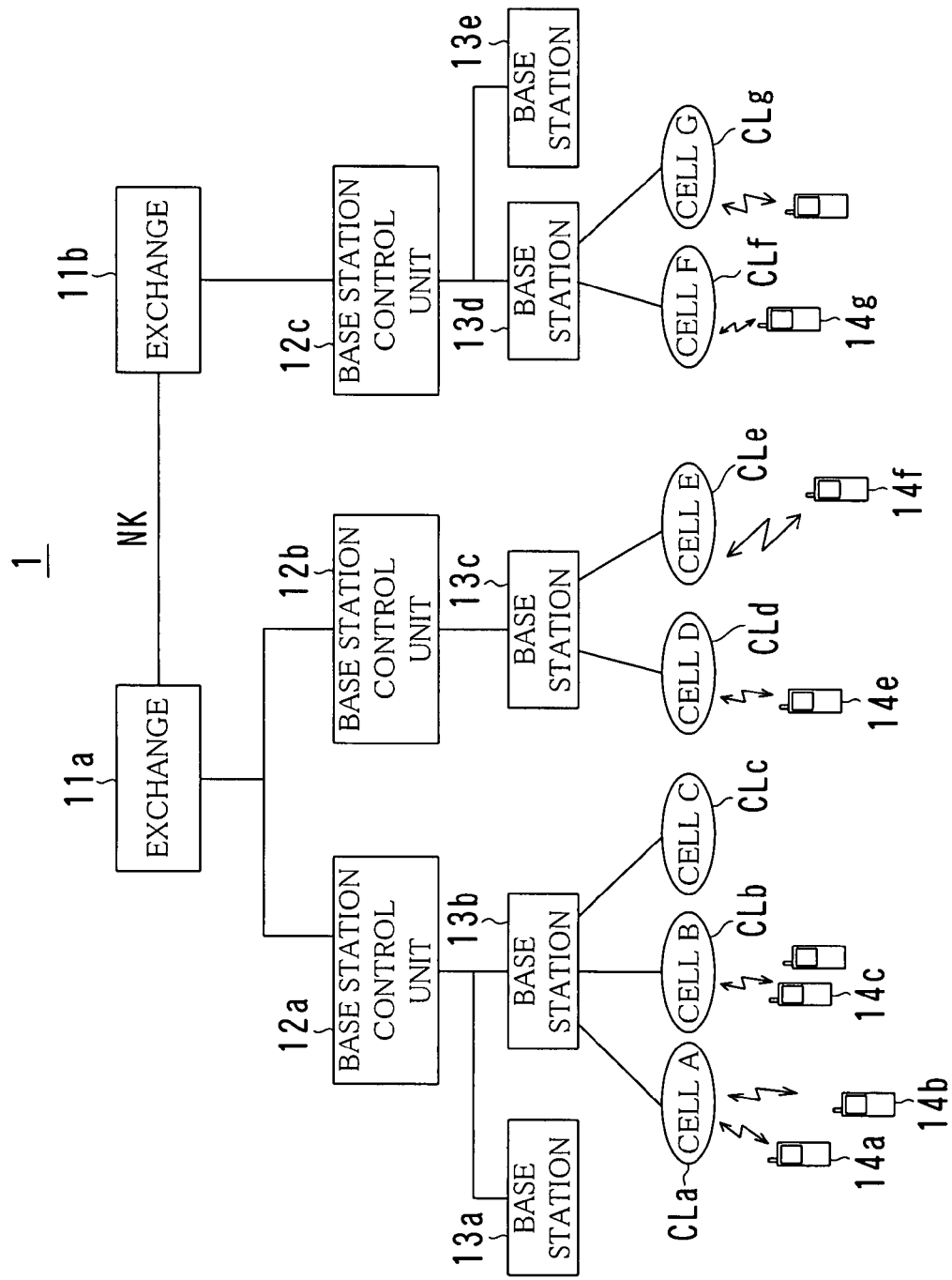
FIG. 1 is a diagram showing a structure of a whole mobile communication network according to the present invention.
Figure 2:
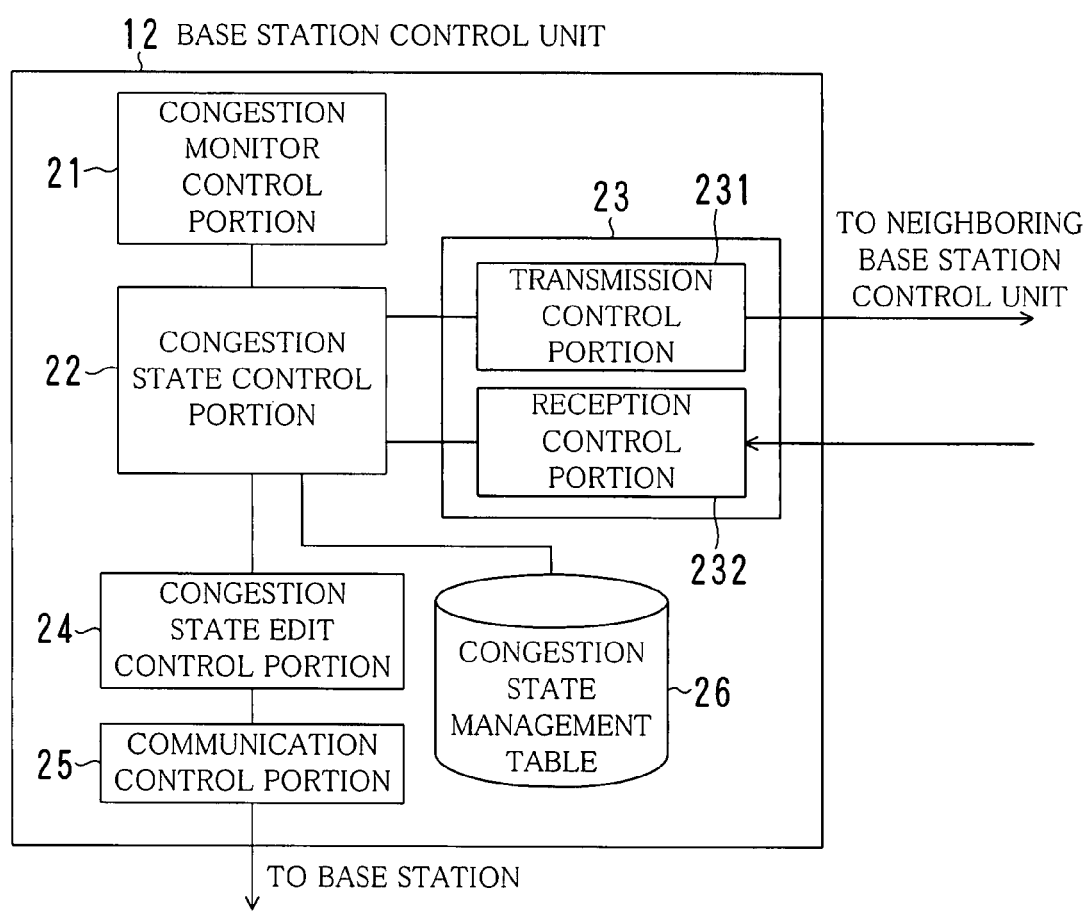
FIG. 2 is a block diagram showing a functional structure concerning a congestion control performed by a base station control unit.
Figure 4:
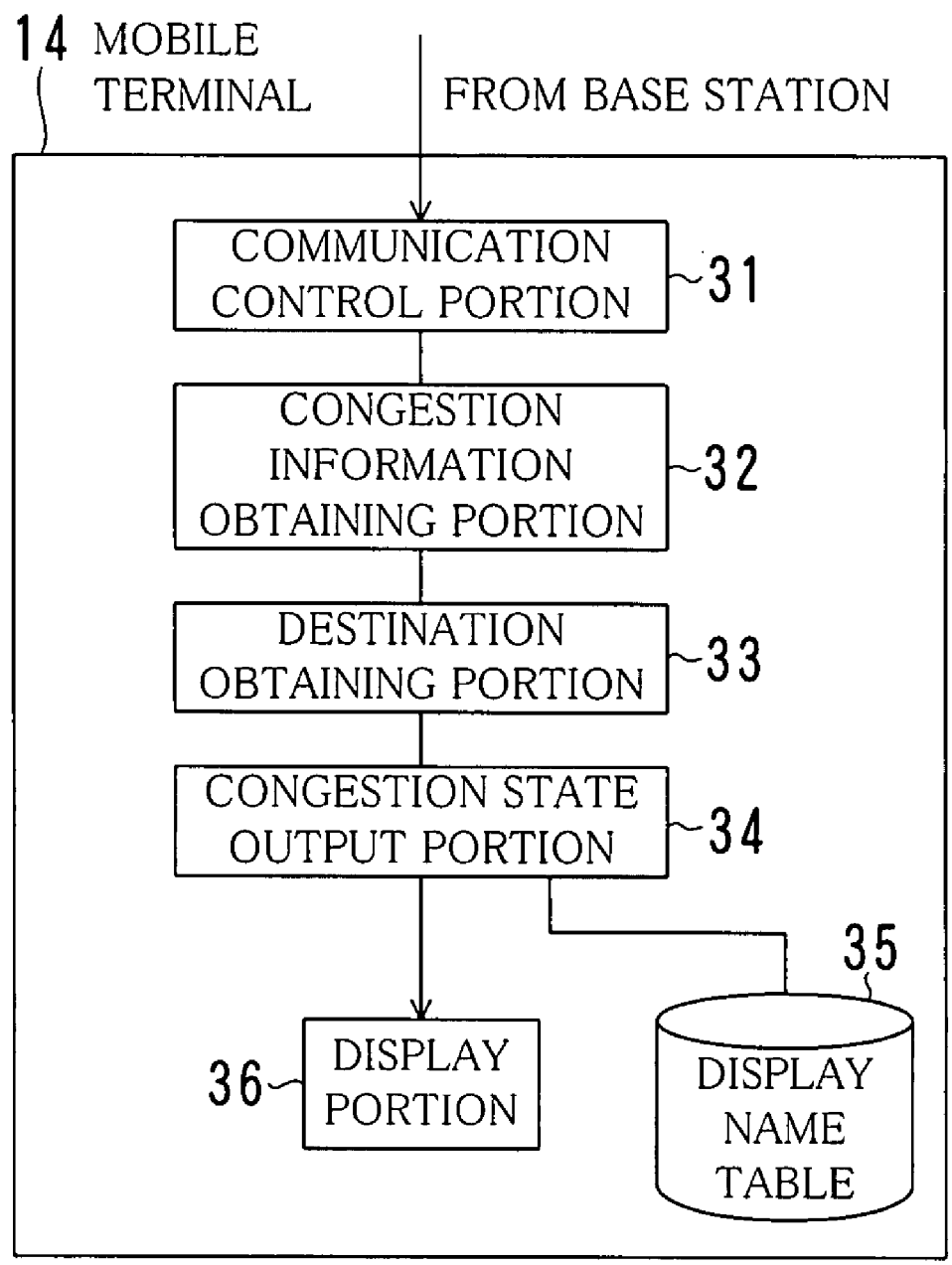
FIG. 4 is a block diagram showing a functional structure of a mobile terminal.
Figure 6:
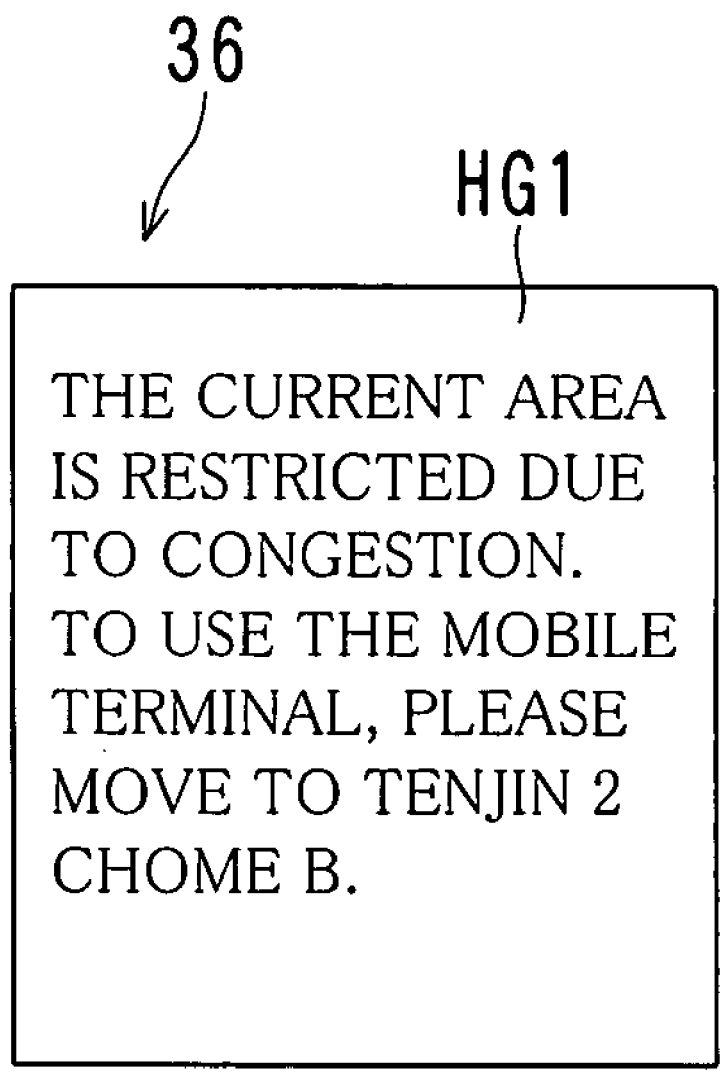
FIG. 6 is a diagram showing an example of a congestion information screen displayed on a display portion of the mobile terminal.

FIG. 1 is a diagram showing a structure of a whole mobile communication network 1 according to the present invention, FIG. 2 is a block diagram showing a functional structure concerning a congestion control performed by a base station control unit, FIG. 3 is a diagram showing an example of a congestion state management table, FIG. 4 is a block diagram showing a functional structure of a mobile terminal, FIG. 5 is a diagram showing an example of a destination corresponding information table, and FIG. 6 is a diagram showing an example of a congestion information screen HG1 displayed on a display portion 36 of the mobile terminal 14.

As shown in FIG. 1, the mobile communication network 1 is made up of exchanges (MSCs) 11a, 11b and so on, base station control units (RNCs) 12a, 12b, 12c and so on, base stations (Node B) 13a, 13b, 13c and so on, mobile terminals 14a, 14b, 14c and so on, and the like. These elements may also be referred to as the exchange 11, the base station control unit 12, the base station 13, and the mobile terminal 14, each of which represents its group without suffix "a", "b" or the like.

The exchanges 11 are connected to each other via basic networks NK, so as to relay signals in communication between the base station control units 12. The exchange 11 is a connection node between a wireless access network and a general circuit switching network. If a request for call connection (request for registration of location) from the wireless access network is issued from an outside of the switching network that the exchange 11 covers, the exchange 11 performs a control of connection with the exchange. If the exchange 11 receives a request for reception from an outside of the switching network, it broadcasts a reception signal to the area base station control unit 12 that covers the mobile terminal 14 in the case where the location information of the mobile terminal 14 of the destination is within the switching network. In addition, the connection node that performs packet communication exchange is called xGSN, which is also included in the exchange 11 of the present embodiment.

The base station control unit 12 controls the base stations 13 and the mobile terminals 14 under it. More specifically, the base station control unit 12 performs a wireless circuit control, a call connection control (including a call clearing-out control) and a mobile (hand over) control with the base station control units and with the base stations, and a communication speed control of the mobile terminal 14, and the like.

The base station control unit 12 informs the exchange 11 of a signal via the base station 13 when calling (registration of location) is performed, and then performs the wireless circuit control with the base station 13. For receiving, it broadcasts a signal from the exchange 11 to a plurality of base stations 13 that are located in a neighborhood of the mobile terminal 14. When it receives a response via the base station 13 that covers the mobile terminal 14, it performs a connection control (circuit control) that is the same as that for calling.

In addition, the base station control unit 12 can decide or recognize whether or not a congestion state occurred for each of the base station control units 12 or for each of the base stations 13 under the base station control units 12 or for each of the base stations 13 or the cells CL (cell CLa, CLb, CLc, CLd and so on) under the base station control units 12. The decision or the recognition whether it is a congestion state or not is performed by various known methods.

For example, the base station control unit 12 decides or recognizes that it is a congestion state responding to an instruction from a console (maintenance monitor console, not shown) that manages the mobile communication network 1. In this case, based on diagnosis of a person who is in charge of monitoring with the console, an instruction that indicates it is a congestion state is issued for each of the base station control units 12, the base stations 13 or the cells CL. In addition, based on a controlling state or a processing state of the base station control unit 12 itself, it is decided whether it is a congestion state or not. For example, the base station control unit 12 monitors a use ratio or the like of the CPU and decides it is a congestion state if the use ratio exceeds a preset threshold level. Alternatively, it is decided based on a use ratio or the like of wireless resources of each base station 13 or each cell CL under the base station control unit 12.

Each of the base stations 13 performs a control of one cell CL or a plurality of cells (a small wireless zone) CL and performs multiplex communication with a plurality of mobile terminals 14 via each cell CL. The base station 13 has a function of relaying a call control signal (calling or registration of location) from the mobile terminal 14 to the base station control unit 12, a function of relaying a wireless circuit control signal from the base station control unit 12 to the mobile terminal 14, and other functions.

The mobile terminal 14 can make connection to the exchange 11 via the base station 13 taking an opportunity of a request signal for connection to the base station control unit 12 and can perform the registration of location and a normal call connection.

Note that the mobile terminal 14 is covered by a cell CL that is controlled by the base station 13. Therefore, if a mobile terminal 14 is covered by a certain cell CL, it can be said that the mobile terminal 14 is under the cell CL, the base station 13 that controls the cell CL and the base station control unit 12 that controls the base station 13.

In addition, there is a case where the mobile terminal 14 can communicate with other cells CL even it is within an area of a certain cell CL. In this case, the mobile terminal 14 can receive a service by selecting a cell CL that is capable of communication most stably with a diversity system.

In addition, it is able to make communication from the cell CL of the base station 13 to the mobile terminal 14 even in a congestion state. It is because that the base station 13 can emit a radio wave to the area of the cell CL as a type of broadcasting so that the mobile terminal 14 can receive the radio wave. For example, the base station 13 uses an information channel for informing mobile terminals within the zone of the cell CL about control information, so that the mobile terminal 14 can receive the information from the base station 13.

As shown in FIG. 2, the base station control unit 12 includes a congestion monitor control portion 21, a congestion state control portion 22, a neighborhood congestion information obtaining portion 23, a congestion state edit control portion 24, a communication control portion 25, a congestion state management table 26 and the like. The neighborhood congestion information obtaining portion 23 has a transmission control portion 231 and a reception control portion 232.

The congestion monitor control portion 21 decides or recognizes whether the base station control unit 12 or a base station 13 under it, or a cell CL is in a congestion state or not. The various known methods as described above can be used for the decision or the recognition whether it is in a congestion state or not.

The congestion state control portion 22 obtains various information about the congestion state and performs various control based on contents of the congestion state. For example, in order to obtain various information about the congestion state of the base station control unit 12 in the neighborhood (neighboring base station control unit), the congestion state control portion 22 instructs the transmission control portion 231 to issue a request for an inquiry thereof. In addition, if a congestion state occurs in the base station control unit 12 or under the same, the congestion state control portion 22 sends a notice of congestion information to relevant mobile terminals 14. In this case, it also issues an instruction to the transmission control portion 231 so as to send the notice of the congestion information to other base station control units 12 in the neighborhood as required. In addition, based on the decision of the congestion monitor control portion 21 and the congestion information obtained from the neighborhood congestion information obtaining portion 23, it updates the congestion state management table 26 that records congestion states for each cell CL.

The neighborhood congestion information obtaining portion 23 inquires other base station control units 12 that control neighboring areas in the mobile communication network 1 about whether or not a base station 13 or a cell CL under it is in a congestion state, and it receives a response to the inquiry so as to obtain congestion information of other base station control units 12. In other words, the transmission control portion 231 sends various requests to the base station control units 12 in the neighborhood in accordance with the instruction from the congestion state control portion 22. The reception control portion 232 receives congestion information and other information from other base station control units 12 in the neighborhood.

Instead that the neighborhood congestion information obtaining portion 23 requests the congestion information via the transmission control portion 231, it is possible that the other base station control units 12 in the neighborhood send the congestion information in a spontaneous manner. In this case, if a congestion state occurs in the base station control unit 12, its congestion information is sent to the other base station control unit 12 in the neighborhood spontaneously.

The congestion state edit control portion 24 decides a destination for the mobile terminal 14 that is in a congestion state under the base station control unit 12 to get rid of the congestion state, based on the congestion information of the congestion state management table 26 updated by the congestion state control portion 22. The destination is decided for a target of the cell CL that is not in a congestion state. Every cell CL to be the target may be designated as the destination, or some of the cells CL or one of the cells CL may be selected as the destination.

It is preferable to use a method such that the current congestion state can be canceled as soon as possible, when the destination is decided. For example, the destination is determined so that the mobile terminal 14 located within the cell CL that is in the congestion state is moved to be distributed to other surrounding cells CL. In this case, for example, they are classified into groups for each of the cells CL that are in the congestion state, or the mobile terminals 14 that are in the congestion state are classified into groups in accordance with the lowest digit of their telephone numbers or the like. Then, one of the cells CL in the neighborhood that are not in the congestion state is assigned to one group as the destination. Alternatively, a plurality of cells CL in the neighborhood that are not in the congestion state are given ranks and are assigned to one group as the destination. If there is possibility that the cell CL to be assigned to as the destination will be in a congestion state due to it, the destination is assigned to a cell CL that is farther from it.

Note that the congestion state edit control portion 24 decides priority YD with a target of a cell CL that is registered in the congestion state management table 26 and is not in a congestion state when the destination to be moved at high priority is decided. For example, with respect to target cells CL, priorities YD are decided sequentially like "1", "2", "3" and so on in the order from the cell CL that is close to the cell CL in the congestion state. Then, as information of the destination, information of the destination cell CL and priority YD thereof is sent as the congestion information to the mobile terminal 14 within the cell CL in the congestion state.

In this case, if the same congestion information is sent to every mobile terminal 14 located within the cell CL that is in a congestion state, the mobile terminal 14 that receives the congestion information will display the destination cells CL in accordance with priority YD. In addition, if the destination cells CL that are different in accordance with priority YD are sent as the congestion information to the mobile terminals 14 that are in the congestion state, different destinations are sent to the mobile terminals 14 that are in a congestion state. The mobile terminals 14 that received the congestion information will display cells CL of different destinations depending on the mobile terminal 14.

In addition, it is possible that the congestion state edit control portion 24 classifies the mobile terminals 14 into a plurality of groups and that different priorities YD are assigned to the groups respectively. In this case, for example, the congestion state management table 26 that indicates the priority YD or the destination should be generated for each of the groups.

In addition, it is possible to assign the same priority YD to the target cells CL. If the same priority YD is assigned, the same destination is notified to all the mobile terminals 14 in the CL that is in the congestion state.

In this way, various methods can be adopted concerning whether or not the mobile terminals 14 in the cell CL that is in the congestion state are classified into groups, whether or not the priority YD is assigned, how the priority YD is determined if it is assigned, how the assigned priority YD is used, how the destination is determined for the classified mobile terminal 14, and the like.

Information of the determined destination is sent to the communication control portion 25 together with the congestion information. Thus, as described later, a screen based on the destination information is displayed on the display portion 36 of the mobile terminal 14 located within the cell CL that is in the congestion state. Note that the "congestion information" may include the destination information in this description.

The communication control portion 25 controls the communication with a plurality of base stations 13, so as to transmit or receive the information including the congestion information and other necessary information. For example, the congestion information and the information about the destination of the mobile terminal 14 are sent to at least the mobile terminal 14 that is in the congestion state and under the base stations 13 so that the user of the mobile terminal 14 can recognize it. In addition, the information is received from the mobile terminal 14 via the base station 13.

In FIG. 3, the congestion state management table 26 records a cell number CB of the managed cell CL, a congestion state flag FH that indicates whether it is in a congestion state or not and the priority YD as the destination of the mobile terminal 14 under the base station control unit 12.

The cell number CB is for recognizing each of the cells CL, and "a", "b", "c" and so on shown in FIG. 3 correspond respectively to the cells CLa, CLb, CLc and so on shown in FIG. 1. Note that "cell CLa", "cell CLb" and so on may be referred to as "cell A", "cell B" and so on in the description or the drawings.

The congestion state flag FH has a value "1" that indicates being in the congestion state and a value "0" that indicates not being in the congestion state. FIG. 3 shows that the cells CLa, CLb and CLc are in the congestion state.

The priority YD has a value "1" that indicates being in the highest priority and the values "2", "3" and so on indicating that their priorities become lower in this order. In FIG. 3, the cell CLd has the highest priority, and the cell CLe, the cell CLf and so on have lower priorities YD in this order. Usually, the cell CL having the priority YD of "1" is selected as the destination. If the cell CL having the priority YD of "1" is not suitable for the destination, the cell CL having the priority YD of "2" is selected as the destination, and the cell CL having the priority YD of "3" or "4" should be selected in this order as the destination.

Further as described above, the mobile terminals 14 in the congestion state may be classified into a plurality of groups based on the determined priority YD, and the destination is assigned to each of the groups in turn.

Note that if the congestion state flags FH are all "0" in FIG. 3, it is not necessary to determine the priority YD usually so that the priority YD is not recorded.

In addition, it is possible to provide the congestion state management table 26 in which the field of the priority YD is omitted as a basic table, and to generate a table like a destination notice table that is provided with a field of the priority YD for each group of the mobile terminals 14 within the range of the cell CL that is in the congestion state. This example will be described later as a fourth example.

In FIG. 4, the mobile terminal 14 includes a communication control portion 31, a congestion information obtaining portion 32, a destination obtaining portion 33, a congestion state output portion 34, a display name table 35, and a display portion 36.

The communication control portion 31 controls wireless communication with the base station 13. For example, it receives notice information sent from the base station 13 by wireless.

The congestion information obtaining portion 32 extracts congestion information if it is included in the received notice information.

The destination obtaining portion 33 obtains destination information if it is included in the congestion information.

The congestion state output portion 34 displays the extracted congestion information on the display portion 36 of the mobile terminal 14 so that the user of the mobile terminal can recognize the congestion state, or it produces an audio output of the information from a speaker. Then, if the destination information of the mobile terminal 14 is included, it is displayed or produced in the same manner as described above. For example, a message, a place name of the destination, a map, a path, road information or the like is produced as the output of the destination.

The display name table 35 stores place names corresponding to area codes designating areas, and it is able to convert the area code into the place name by referring to the display name table 35 or searching the same. For example, a cell number CB is used as the area code. For example, a habitation display is used as the place name.

As shown in FIG. 5, the display name table 35 records the cell number CB and a display name HM. In this example, if "cell CLa" is designated as the destination in the congestion information that is received from the base station control unit 12, "TENJIN 1 CHOME A" is displayed. If "cell CLb" is designated as the destination, "TENJIN 1 CHOME B" is displayed.

As shown in FIG. 6, the display portion 36 displays the congestion information screen HG1 based on the congestion information, which indicates that communication is restricted because in the area (cell CL) in which the mobile terminal 14 is receiving services, congestion occurs currently in the area, and that the user has to move another area (cell CL) for using the mobile terminal 14, and that the destination having higher priority is "TENJIN 2 CHOME B". In this case, if a plurality of areas (cells CL) are notified as the destination information, a list of the plurality of areas may be displayed. Alternatively, the areas may be displayed one by one when a button of the mobile terminal 14 is pressed.

Note that the congestion information screen HG1 is displayed without a special operation on the mobile terminal 14 as long as the mobile terminal 14 is powered on. If the mobile terminal 14 is powered on, the mobile terminal 14 receives the notice information that is broadcasted from a near base station 13 intermittently. Therefore, even if call and reception are unable due to a congestion state, the mobile terminal 14 can receive the notice information from the base station 13 and can display the congestion information on the display portion 36. Note that contents of the congestion information screen HG1 are the congestion information.

The user of this mobile terminal 14 sees the congestion information screen HG1 so as to know that communication is unable in the area because a congestion state has occurred, and that it is able to get rid of the congestion state for making communication by moving to "TENJIN 2 CHOME B" that is displayed as the destination. This congestion information screen HG1 is displayed also on other mobile terminals 14 within the area. In addition, the destination is determined by the congestion state edit control portion 24 so that users are not concentrated in the same area but are dispersed as much as possible. Therefore, the user who wants to get rid of the congestion state will move to the destination that is displayed on each mobile terminal so that the traffic in the area is reduced. Further, occurrence of a congestion state is avoided in the destination, so that the congestion state will be canceled soon.

In this way, according to the present embodiment, when a congestion state occurs, its information is sent to the mobile terminals 14, and a destination to move for getting rid of the congestion state is guided on the screen or by sounds or the like. Therefore, the congestion state can be cancelled soon so that the mobile terminal 14 can make call and reception.

Next, the operation of the mobile communication network 1 will be described along with concrete examples.

First Example

Figure 7:
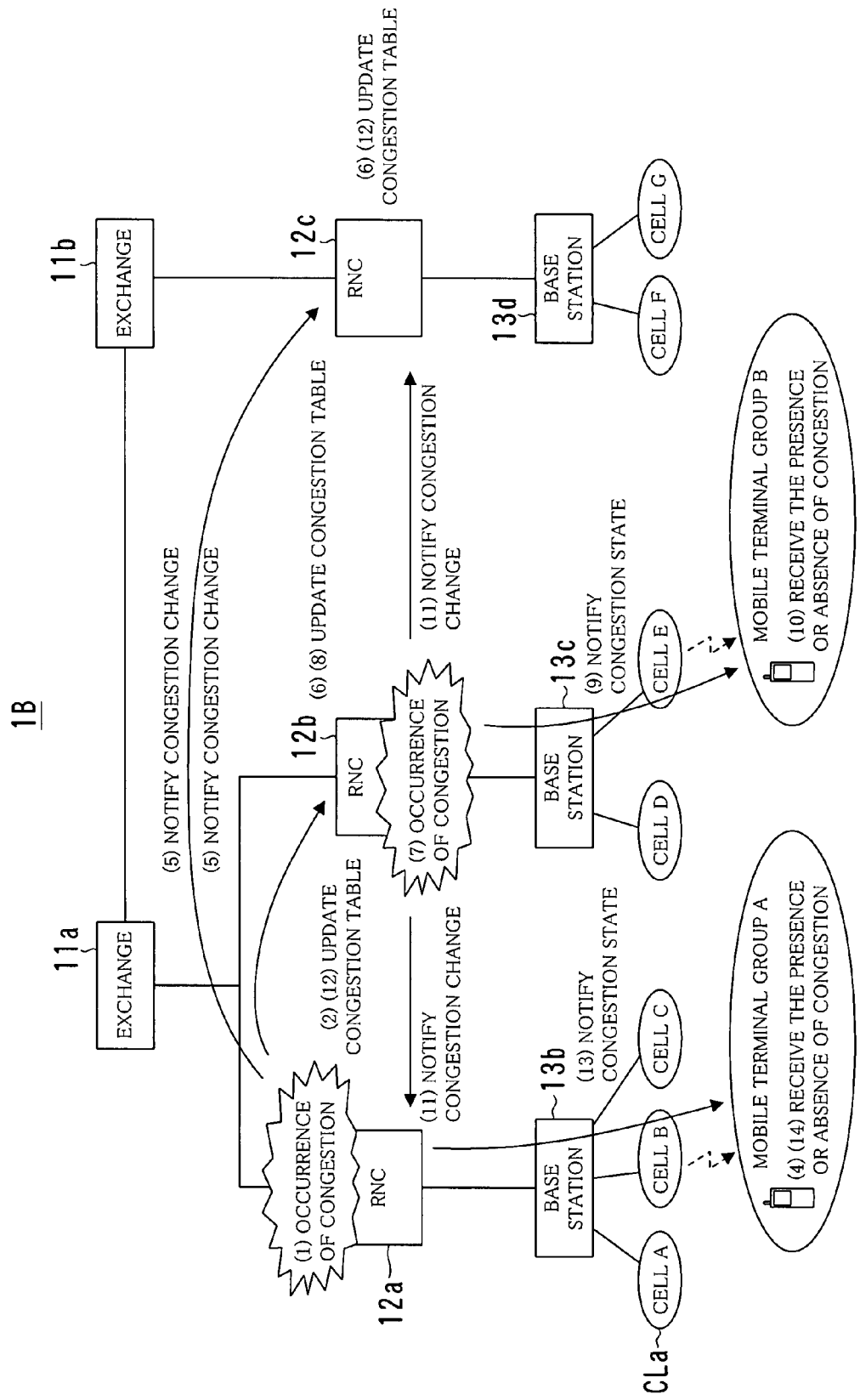
FIG. 7 is a diagram of the whole mobile communication network showing a first example.

FIG. 7 is a diagram of the whole mobile communication network 1B showing a first example, and FIGS. 8A, 8B and 8C are diagrams showing a change in contents of the congestion state management table 26.

In the first example, the base station control units 12a-12c are close or neighboring to each other. The cells CLa-CLg are cells CL that are close or neighboring to each other on the periphery. The base station control units 12a-12c have individual functions as shown in FIG. 2. The transmission control portions 231 and the reception control portions 232 thereof are connected to each other, so that congestion information can be sent and received.

In the first example, the congestion state management table 26 is in the state shown in FIG. 8A if the mobile communication network 1B is managed normally. Although the congestion state management table 26 is provided to each of the base station control units 12a-12c, contents thereof are the same between neighboring cells CLa-CLg. Therefore, the single congestion state management table 26 is shown as a representative in FIGS. 8A, 8B and 8C.

In the first example, a congestion state occurs first in the base station control unit 12a, and then a congestion state occurs in the base station control unit 12b. Hereinafter, this example will be described along with the following steps (1) to (14).

(1) When a congestion state occurs in the base station control unit 12a, the congestion monitor control portion 21 detects it. Then, the congestion monitor control portion 21 sends information of the congestion state to the congestion state control portion 22.

(2) The congestion state control portion 22 receives the information of the congestion state and updates the congestion state management table 26 of the base station control unit 12a. Since the congestion state occurred in the base station control unit 12a, the cells CLa-CLc under the base station control unit 12a become in the congestion state. The congestion state management table 26 is updated to the state shown in FIG. 8B.

(3) The congestion state control portion 22 of the base station control unit 12a sends information of the change in the congestion state to the congestion state edit control portion 24. The congestion state edit control portion 24 that received the information determines priorities YD for the cells CLd-CLg that are not in a congestion state and records them in the congestion state management table 26. Then congestion information is generated by editing contents of the congestion state management table 26 and is sent to the communication control portion 25. The communication control portion 25 sends notice information to the mobile terminals 14 that belong to the group A via the base station 13b. On this occasion, the congestion information is added to the notice information for transmission.

(4) The mobile terminal 14 that belongs to the group A receives the notice information by the communication control portion 31 and informs the congestion information obtaining portion 32 about the reception of the notice information. The congestion information obtaining portion 32 extracts the congestion information from the notice information, and the congestion information is sent to the destination obtaining portion 33. The destination obtaining portion 33 analyzes the received congestion information and knows that the cells CLa-CLc have become in the congestion state. From the priority YD included in the congestion information, it is obtained that call and reception becomes possible by moving in the direction to the cell CLd, CLe, CLf or CLg. Then, the destination with the priority YD (priority destination notice) is sent to the congestion state output portion 34. The congestion state output portion 34 obtains place names corresponding to the cells CLd-CLg by referring to the display name table 35, and the obtained place names are displayed on the display portion 36 in accordance with the priority YD.

(5) After the control of (2) is performed in the base station control unit 12a, the congestion state control portion 22 sends the congestion information also to the transmission control portion 231 of the neighborhood congestion information obtaining portion 23 and sends the congestion information to the base station control units 12b and 12c.

(6) The reception control portion 232 of each of the base station control units 12b and 12c receives the congestion information from the base station control unit 12a and informs each of the congestion state control portions 22 about the occurrence of the congestion state. The congestion state control portion 22 updates the congestion state management table 26 to the state shown in FIG. 8B based on the notice. In this way, the congestion state management tables 26 of all base station control units 12a-12c that are neighboring to each other are updated to the same contents.

(7) The congestion monitor control portion 21 detects the occurrence of the congestion state in the base station control unit 12b and sends a notice of the occurrence of the congestion state to the congestion state control portion 22.

(8) The congestion state control portion 22 receives the notice and updates the congestion state management table 26 of the base station control unit 12b. Since the congestion state occurred in the base station control unit 12b, the cells CLd-CLe under the base station control unit 12b become in the congestion state. Since the cells CLa-CLc are already in the congestion state at that time point, the congestion state management table 26 is updated to the state shown in FIG. 8C.

(9) The congestion state control portion 22 of the base station control unit 12b sends notice of the change in the congestion state to the congestion state edit control portion 24. The congestion state edit control portion 24 that receives the notice sends the congestion information that is obtained by editing contents of the congestion state management table 26 to the communication control portion 25. The communication control portion 25 sends the congestion information that is added to the notice information to the mobile terminals 14 belonging to the group B via the base station 13c.

(10) The mobile terminal 14 belonging to the group B receives the notice information from the communication control portion 31 and sends it to the congestion information obtaining portion 32. The congestion information obtaining portion 32 obtains the congestion information having contents shown in FIG. 8C from the notice information and sends it to the destination obtaining portion 33. The destination obtaining portion 33 analyzes the received congestion information and recognizes that the cells CLa-CLe have become in the congestion state. Since it is able to get rid of the congestion state by moving in the direction to the cell CLf or CLg, this information is sent to the congestion state output portion 34. The congestion state output portion 34 obtains the place names corresponding to the cells CLf-CLg by referring to the display name table 35, and the obtained place names are displayed on the display portion 36 together with the congestion information.

(11) After the control in the base station control unit 12b, the congestion state control portion 22 thereof sends the congestion information also to the transmission control portion 231 of the neighborhood congestion information obtaining portion 23 and transmits the congestion information to the base station control units 12a and 12c.

(12) The reception control portion 232 of each of the base station control units 12a and 12c receives the congestion information from the base station control unit 12b and sends the notice indicating that the congestion state occurred to each of the congestion state control portions 22. Based on this notice the congestion state control portion 22 updates the congestion state management table 26 to the state shown in FIG. 8C.

(13) Further, the congestion state edit control portion 24 of the base station control unit 12a that is already in the congestion state detects that contents of the congestion state management table 26 is changed from the state shown in FIG. 8B to the state shown in FIG. 8C and edits the contents of the congestion state management table 26 again, so that the reedited congestion information is sent to the communication control portion 25. The communication control portion 25 sends the congestion information that is added to the notice information to the mobile terminal 14 that belongs to the group A via the base station 13b.

(14) The mobile terminal 14 that belongs to the group A under the base station control unit 12a performs a process that is similar to the process described above on the received notice information, and the congestion information including the place name of the destination is displayed on the display portion 36.

Note that the group A in the first example is a group including the mobile terminals 14 located within the cells CLa-CLc, while the group B is a group including the mobile terminals 14 located within the cells CLd-CLe.

Second Example

Figure 9:
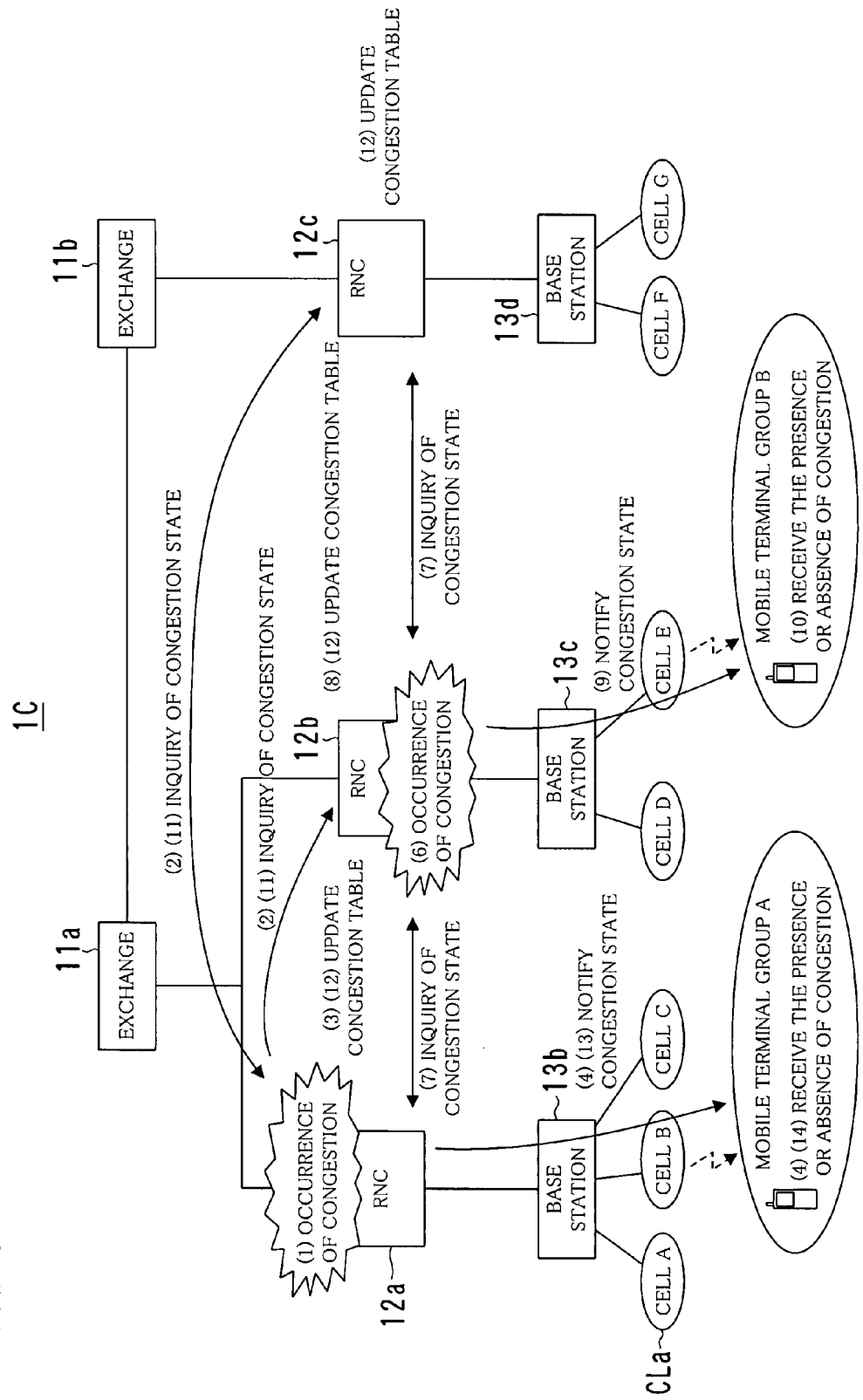
FIG. 9 is a diagram of the whole mobile communication network showing a second example.

FIG. 9 is a diagram of the whole mobile communication network 1C showing a second example.

In the second example, a congestion state occurs first in the base station control unit 12a, and after that a congestion state occurs in the base station control unit 12b.

In the first example described above, the base station control unit 12 in which the congestion occurred sends the congestion information to the surrounding base station control units 12 so that each base station control unit 12 updates congestion states of the surrounding base station control units 12. According to the second example, when a congestion state occurs, the congestion information is updated by inquiring surrounding base station control units 12 about their congestion states. Here, a difference from the first example will be described mainly. Note that the states of the congestion state management table 26 will be described with reference to FIGS. 8A, 8B and 8C in the same manner as in the first example.

(1) The congestion monitor control portion 21 detects a congestion state in the base station control unit 12a and sends information of the congestion state to the congestion state control portion 22.

(2) The congestion state control portion 22 receives the information of the congestion state and updates the congestion state management table 26 of the base station control unit 12a as shown in FIG. 8B.

The congestion state control portion 22 instructs the transmission control portion 231 so that the transmission control portion 231 makes communication to the base station control units 12b and 12c for inquiring about a congestion state. The congestion state control portion 22 of each of the base station control units 12b and 12c analyzes the inquiry signal that was received by each reception control portion 232, and the congestion information is extracted from the congestion state management table 26 of each of the base station control units 12b and 12c. The congestion state control portion 22 sends the extracted congestion information to the transmission control portion 231, and the information is transmitted from the transmission control portion 231 to the base station control unit 12a.

(3) The base station control unit 12a receives the congestion information returned from the base station control units 12b and 12c with the reception control portion 232 and transmits the same to the congestion state control portion 22. The congestion state control portion 22 updates the congestion state management table 26 as shown in FIG. 8B based on the received congestion information.

(4) Similar to (3) in the first example.

(5) Similar to (4) in the first example.

(6) The congestion monitor control portion 21 detects occurrence of a congestion state in the base station control unit 12b and sends notice of the congestion state to the congestion state control portion 22.

(7) The congestion state control portion 22 that received the notice updates the congestion state management table 26. Since the congestion occurred in the base station control unit 12b, the cells CLd-CLe under the base station control unit 12b become in the congestion state. Since the cells CLa-CLc are already in the congestion state, the congestion state management table 26 is updated to the state shown in FIG. 8C.

The congestion state control portion 22 of the base station control unit 12b makes an inquiry of a congestion state to the base station control units 12a and 12c. Each of the base station control units 12a and 12c analyzes an inquiry signal received by the reception control portion 232 with the congestion state control portion 22 and extracts the congestion information from each of the congestion state management tables 26. The congestion state control portion 22 sends the extracted congestion information to the transmission control portion 231 so that the transmission control portion 231 transmits the same to the base station control unit 12b.

(8) The congestion state control portion 22 of the base station control unit 12b receives the congestion information from the base station control units 12a and 12c with the reception control portion 232 and sends the congestion information to the congestion state control portion 22. The congestion state control portion 22 updates the congestion state management table 26, but it is the same as the existing state shown in FIG. 8C in this example.

(9) Similar to (9) in the first example.

(10) Similar to (10) in the first example.

(11) The base station control unit 12a makes inquiry about a congestion state in the above-mentioned (2), and then performs control of (2)-(5) at a constant interval of time, so as to transmit the congestion information to the mobile terminal 14 of the group A based on the latest congestion information. Subsequent steps are the same as the above-mentioned (2)-(5).

Third Example

FIG. 10 is a diagram of the whole mobile communication network 1D showing a third example, and FIGS. 11A, 11B and 11C are diagrams showing a change in contents of the congestion state management table 26.

The third example describes a case in which a congestion state occurs first in the cell CLb of the base station control unit 12a, and then a congestion state occurs in the cell CLe of the base station control unit 12b.

(1) A congestion state occurs in the cell CLb under the base station control unit 12a.

(2) The congestion monitor control portion 21 of the base station control unit 12a detects the congestion state and sends a notice of the occurrence of the congestion state to the congestion state control portion 22.

(3) The congestion state control portion 22 receives the notice of the occurrence of the congestion state and updates the congestion state management table 26 of the base station control unit 12a. Since the congestion occurred in the cell CLb under the base station control unit 12b, it is updated to the state shown in FIG. 11B.

(4) The congestion state control portion 22 of the base station control unit 12a sends the notice indicating the change of the congestion state to the congestion state edit control portion 24. The congestion state edit control portion 24 that received the notice sends the congestion information obtained by editing contents of the congestion state management table 26 to the communication control portion 25. The communication control portion 25 transmits the congestion information that is added to the notice information via the base station 13b to the mobile terminal 14 of the group A.

(5) The mobile terminal 14 that belongs to the group A receives the notice information from the communication control portion 31 and sends a notice indicating the reception of the notice information to the congestion information obtaining portion 32. The congestion information obtaining portion 32 extracts congestion information from the notice information and sends the congestion information to the destination obtaining portion 33. The destination obtaining portion 33 analyzes the received congestion information so as to know that the cell CLb becomes in the congestion state. It recognizes from the priority YD included in the congestion information that it is able to perform call and reception by moving in the direction toward the cell CLa, CLc, CLd, CLe, CLf or CLg, so as to send the priority destination notice to the congestion state output portion 34. The congestion state output portion 34 obtains place names corresponding to the cells CLa, CLc-CLg by referring to the display name table 35 and displays the place names based on the priority YD together with the congestion state on the display portion 36.

(6) After the control shown in the above step (2) performed by the base station control unit 12a, the congestion state control portion 22 sends the congestion information to the base station control units 12b and 12c via the transmission control portion 231.

(7) The reception control portion 232 of each of the base station control units 12b and 12c receives the congestion information from the base station control unit 12a and sends a notice to the congestion state control portion 22. Based on contents thereof, the congestion state control portion 22 updates the congestion state management table 26 of each of them into the state shown in FIG. 11B.

(8) A congestion state occurs in the cell CLe under the base station control unit 12b.

(9) The congestion monitor control portion 21 of the base station control unit 12b detects the congestion state thereof and sends a notice to the congestion state control portion 22.

(10) The congestion state control portion 22 updates the congestion state management table 26 to the state shown in FIG. 11C.

(11) The congestion state control portion 22 of the base station control unit 12b sends a notice to the congestion state edit control portion 24, which indicates that the congestion state has changed. The congestion state edit control portion 24 that received the notice sends the congestion information to the communication control portion 25. The communication control portion 25 sends the congestion information to the mobile terminal 14 of the group B via the base station 13c.

(12) The mobile terminal 14 that belongs to the group B receives the notice information from the communication control portion 31 and sends a notice of reception of the notice information to the congestion information obtaining portion 32. The congestion information obtaining portion 32 extracts the congestion information from the notice information and sends the congestion information to the destination obtaining portion 33. The destination obtaining portion 33 knows that the cells CLb and CLe have become in the congestion state by analyzing the received congestion information. Thus, it knows that it is able to perform call and reception by moving in the direction to the cell CLa, CLc, CLd, CLf or CLg and sends the priority destination notice to the congestion state output portion 34. The congestion state output portion 34 obtains place names corresponding to the cells CLa, CLc, CLd, CLf and CLg by referring to the display name table 35, so that the congestion information as well as with this is displayed on the display portion 36.

(13) After the control of the above step (10) performed by the base station control unit 12b, the congestion state control portion 22 sends the congestion information to the base station control units 12a and 12c via the transmission control portion 231.

(14) Each of the base station control units 12a and 12c updates the congestion state management table 26 to the state shown in FIG. 11C based on the received congestion information.

(15) Similar to the above step (4).

(16) Similar to the above step (5). However, contents of the notice are different. Since the priority destination is the cell CLa, CLc, CLd, CLf or CLg, a place name corresponding to it is displayed as the destination.

Fourth Example

Figure 12:
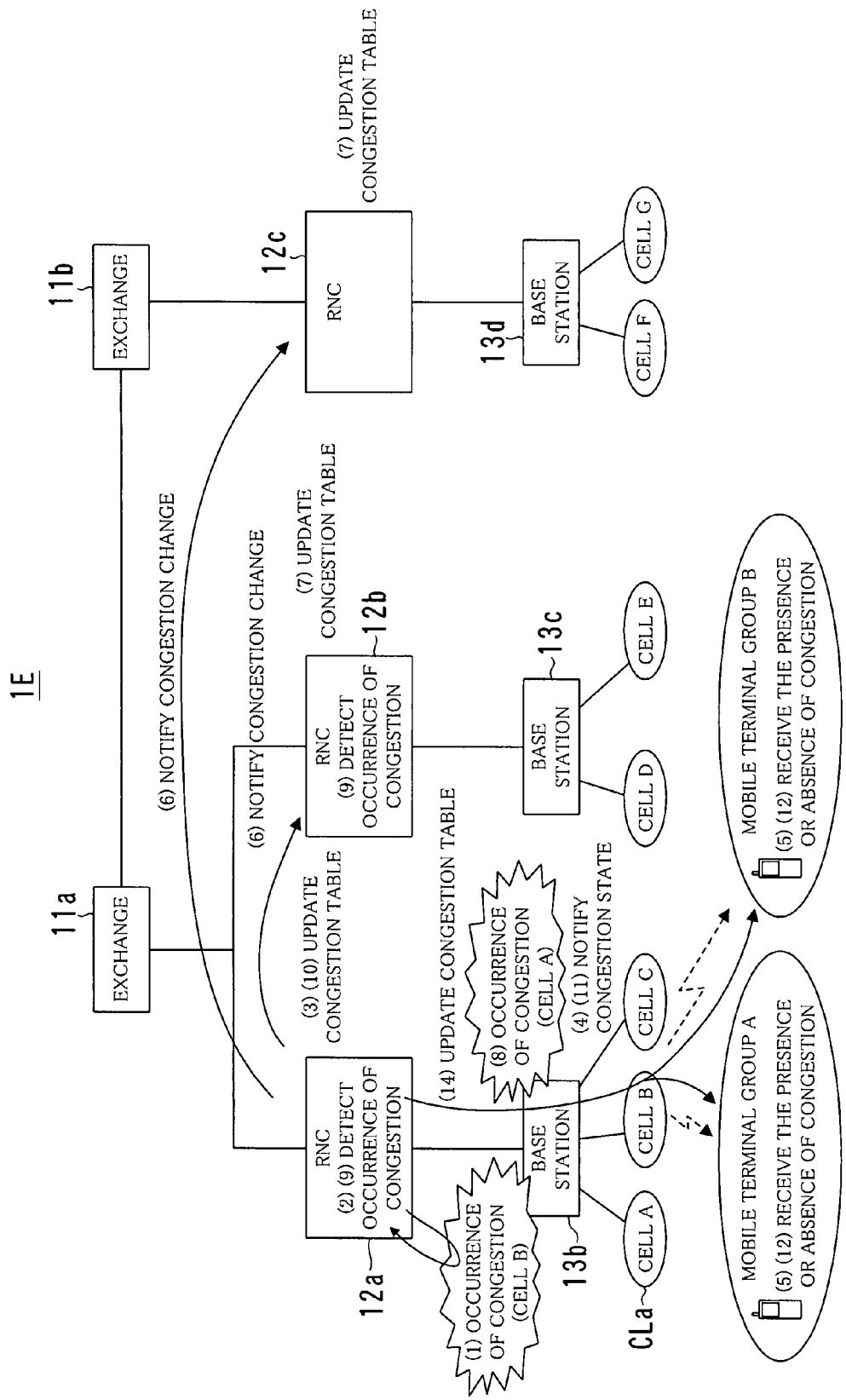
FIG. 12 is a diagram of the whole mobile communication network showing a fourth example.

FIG. 12 is a diagram of the whole mobile communication network 1E showing a fourth example, FIGS. 13A, 13B and 13C are diagrams showing a change in contents of the congestion state management table 26, and FIGS. 14A-14F are diagrams showing contents of the congestion state management tables 26a and 26b that are transmitted to the mobile terminals 14 that belong to the two groups A and B, respectively. Furthermore, FIGS. 14A-14C show contents that are sent to the group A, and FIGS. 14D-14F show contents that are sent to the group B.

The fourth example shows the case where a congestion state occurs first in the cell CLb of the base station control unit 12a and then a congestion state occurs in the cell CLa. The mobile terminals 14 of the group A and the mobile terminals 14 of the group B are located in the cell CLb.

In the fourth example, the group A includes approximately half the number of mobile terminals 14 that are located in the cell CLb, and the group B includes the other half the number of mobile terminals 14 that are located in the cell CLb. This grouping can be performed by checking whether the least significant digit of a telephone number of the mobile terminal 14 is an odd number or an even number, for example.

(1) A congestion state occurs in the cell CLb under the base station control unit 12a.

(2) The congestion monitor control portion 21 detects the congestion state.

(3) The congestion state control portion 22 updates the congestion state management table 26 of the base station control unit 12a to the state shown in FIG. 13B.

(4) The congestion state control portion 22 further sends a notice to the congestion state edit control portion 24, which indicates that the congestion state has changed. The congestion state edit control portion 24 that received the notice analyzes contents of the notice and recognizes that the cell CLb under its own base station control unit 12a becomes in the congestion state.

The congestion state edit control portion 24 edits contents of the congestion state management table 26 with respect to the mobile terminal 14 of the group A that is located in the cell CLb. When this edit is performed, a new congestion state management table 26a is generated for the group A. Contents of the congestion state management table 26a becomes in the state shown in FIG. 14B. The congestion state edit control portion 24 generates congestion information HJa that includes the contents of the edited congestion state management table 26a shown in FIG. 14B for notifying that it has become in the congestion state, so that the generated congestion information HJa is sent to the communication control portion 25. The communication control portion 25 sends the congestion information HJa to the mobile terminal 14 of the group A via the base station 13b.

At the same time, the congestion state edit control portion 24 edits contents of the congestion state management table 26 with respect to the mobile terminal 14 of the group B located in the cell CLb. When this edit is performed, a new congestion state management table 26b is generated for the group B. The contents of the congestion state management table 26b becomes in the state shown in FIG. 14E. The congestion state edit control portion 24 generates congestion information HJb including the contents of the edited congestion state management table 26b shown in FIG. 14E for notifying that it becomes in the congestion state, so that the generated congestion information HJb is sent to the communication control portion 25. The communication control portion 25 sends the congestion information HJb to the mobile terminal 14 of the group B via the base station 13b.

It should be noted here that priority YD shown in FIG. 14B and the priority YD shown in FIG. 14E are different from each other. As a result, as described later, different cells CL and different orders of cells CL are displayed as destinations for the groups A and B.

(5) The mobile terminal 14 that belongs to the group A receives the notice information by the communication control portion 31 and notifies the same to the congestion information obtaining portion 32. The congestion information obtaining portion 32 extracts the congestion information HJa from the notice information and sends the same to the destination obtaining portion 33. The destination obtaining portion 33 analyzes the congestion information HJa and determines the destination based on the priority YD. The congestion state output portion 34 displays the destination together with the congestion information HJa on the display portion 36. As a result, the place name of the cell CLa and the place name of the cell CLc are displayed in accordance with the priority YD.

The same process is performed also in the group B. Since contents shown in FIG. 14E are notified as the congestion information HJb, a place name of the cell CLc and a place name of the cell CLa are displayed in this order in accordance with priority YD thereof.

In this way, the destination that is displayed first is different between the mobile terminal 14 of the group A and the mobile terminal 14 of the group B. As a result, the users of the group A and the group B are dispersed into different destinations for getting rid of the congestion state.

(6) After the control of the above-mentioned (2) performed by the base station control unit 12a, the congestion state control portion 22 sends the congestion state to the base station control units 12b and 12c via the transmission control portion 231.

(7) Each of the base station control units 12b and 12c updates the congestion state management table 26 to the contents shown in FIG. 13B based on the received congestion state.

(8) A congestion state occurs in the cell CLa under the base station control unit 12a.

(9) The congestion monitor control portion 21 detects the congestion state thereof.

(10) The congestion state control portion 22 updates the congestion state management table 26 of the base station control unit 12a to the state shown in FIG. 13C.

(11) The congestion state control portion 22 further sends a notice to the congestion state edit control portion 24, which indicates that the congestion state has changed. The congestion state edit control portion 24 that received the notice analyzes contents of the notice and recognizes that the cells CLa and CLb have become in the congestion state. The congestion state edit control portion 24 revises and edits contents of the congestion state management table 26a with respect to the mobile terminals 14 of the group A that are located in the cells CLa and CLb, so that the congestion state management table 26a is sent to the communication control portion 25. The communication control portion 25 sends the congestion information HJa to the mobile terminals 14 of the group A that are located in the cells CLa and CLb via the base station 13b. Contents of the congestion information HJa that is sent in this case is in the state shown in FIG. 14C.

At the same time, contents of the congestion state management table 26b shown in FIG. 14F are sent as the congestion information HJb to the mobile terminals 14 of the group B that are located in the cells CLa and CLb by the same process.

(12) The mobile terminal 14 that belongs to the group A receives the notice information by the communication control portion 31 and sends the same to the congestion information obtaining portion 32. The congestion information obtaining portion 32 extracts the congestion information HJa from the notice information and sends the same to the destination obtaining portion 33. The destination obtaining portion 33 analyzes the congestion information HJa and determines the destination based on the priority YD thereof. The congestion state output portion 34 displays the destination together with the congestion information HJa on the display portion 36. As a result, a place name of the cell CLc and a place name of the cell CLd are displayed in this order in accordance with the priorities YD of them.

The same process is performed for the group B. Since the contents shown in FIG. 14F is notified as the congestion information HJb, a place name of the cell CLd and a place name of the cell CLc are displayed in this order in accordance with the priorities YD of them.

In this way, as to the fourth example, the congestion state management tables 26a and 26b having different priorities YD are generated for each of the groups, and a plurality of destinations having priorities YD assigned to the mobile terminals 14 of the groups A and B are sent as the congestion information HJa and HJb. The mobile terminal 14 of each of the groups displays the place names of the destinations based on the priorities YD. When they are displayed, a list of the place names arranged in the order of the priorities may be displayed on the screen HG. Alternatively, a place name having the highest priority YD may be displayed first on the screen HG, and other place names having lower priorities YD may be displayed one by one upon an operational input or when a predetermined time has passed.

Next, a general flow of the congestion control performed by the mobile communication network 1 in the present embodiment will be described along with a flowchart.

Figure 15:
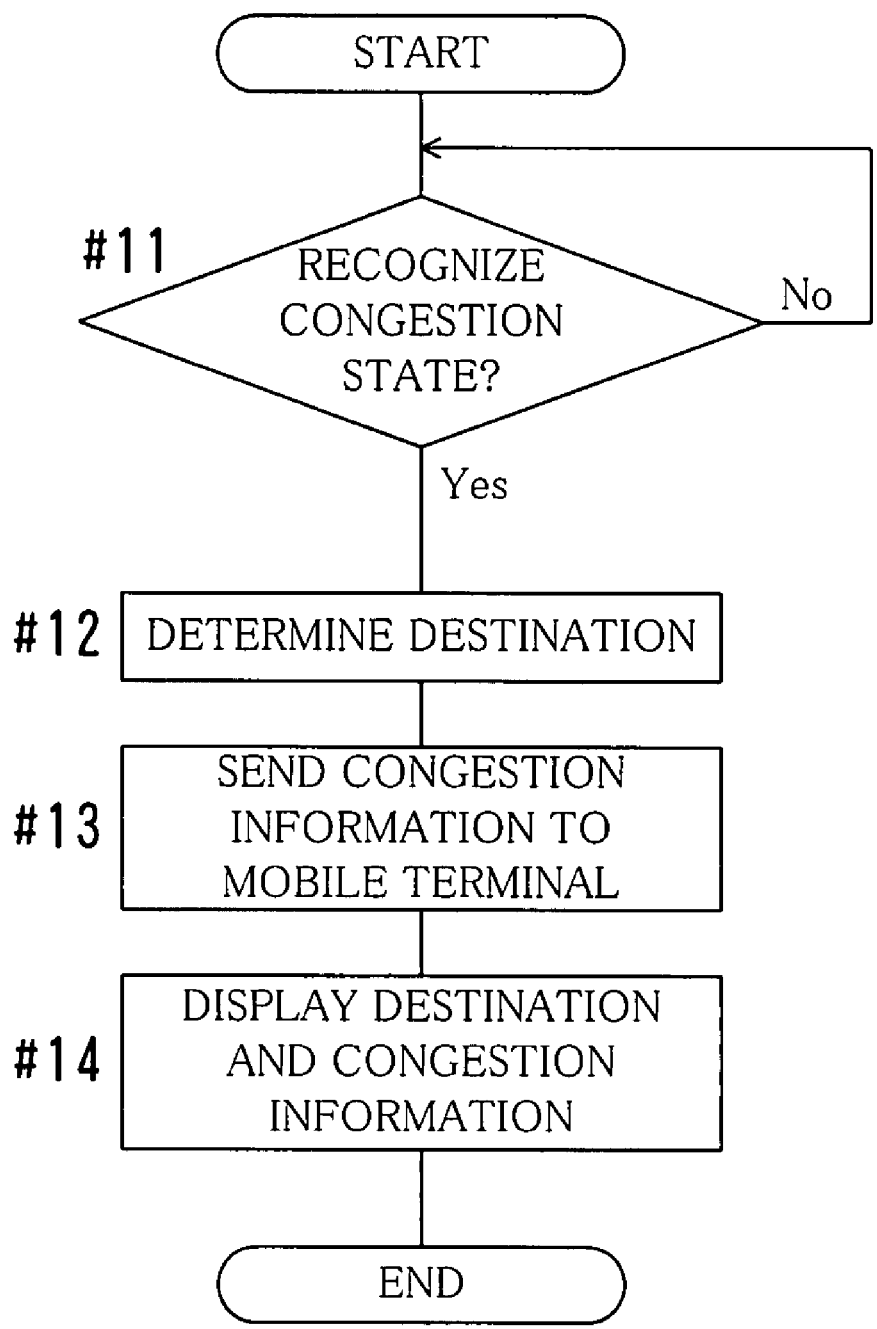
FIG. 15 is a flowchart showing a general flow of the congestion control.

FIG. 15 is a flowchart showing a general flow of the congestion control.

As shown in FIG. 15, when the base station control unit 12 recognizes the congestion state (Yes in #11), the destination is determined for each cell CL or each group (#12). There are one or more destinations. The congestion information including the destination is sent (broadcasted) together with other notice information from the base station 13 to each of the mobile terminals 14 (#13).

The each of the mobile terminals 14 that received the notice information displays the congestion information and the destination extracted from the notice information on its screen (#14). Alternatively, the congestion information is produced as audio information.

Although the display name table 35 is kept in each of the mobile terminals 14 in the embodiment described above, it is possible to transmit the place name of the destination directly from the base station control unit 12 to display the same without keeping the display name table 35 in the mobile terminal 14. Alternatively, it is possible to transmit the coordinate of the destination on the GPS from the base station control unit 12 and to display the destination on a map on the screen of the mobile terminal 14 based on the coordinate. Note that it is possible to modify the congestion information of the mobile terminal 14 or a display method and contents of the destination variously in accordance with a size, performance and the like of the display portion 36 of the mobile terminal 14.

In the above-mentioned embodiment and various examples, the structures and contents of the congestion state management tables 26, 26a and 26b or the display name table 35 can be modified variously other than the above description.

Furthermore, the configuration, the structure, the shape, of the entire or a part of the mobile terminal 14, the base station control unit 12 or the mobile communication network 1, the contents of the image, the order or the contents of the process can be modified variously in accordance with the spirit of the present invention, if necessary.

Although the embodiments of the present invention are described with reference to some examples above, the present invention is not limited to the embodiments described above but can be embodied in various ways.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A congestion control method in a mobile communication network, comprising:
   recognizing by a base station control unit of the mobile communication network that the base station control unit or a base station under the base station control unit or a cell under the base station control unit becomes in a congestion state; and
   when the congestion state was recognized, sending a notice to the base station control unit or the base station or a mobile terminal that is located in the cell, which is in the congestion state, about congestion information that is information on the congestion state, based on control performed by the base station control unit, so that a user of the mobile terminal can recognize the congestion state,
   wherein
   the base station control unit that recognized the congestion state manages the congestion state by the cell,
   a plurality of mobile terminals to which the notice of the congestion information should be sent are divided into a plurality of groups, the congestion information is generated for each of the groups, the congestion information indicating destinations to which the mobile terminals belonging to each of the groups are moved, and a priority order of the destinations in order to get rid of the congestion state, wherein the destinations or the priority order of the destinations are determined to be different for each of the groups, and
   the notice of the congestion information is sent to the mobile terminals of each of the groups, the congestion information indicating the destinations or the priority order of the destinations different for each of the groups.

2. The congestion control method according to claim 1, wherein when the notice of the congestion information is sent to the mobile terminal, the notice is performed so that a message of the information is displayed on a screen of the mobile terminal or an audio output is produced from a speaker of the mobile terminal.

3. The congestion control method according to claim 1, wherein
the base station control unit that recognized the congestion state sends a notice of the congestion information to a second base station control unit serving as another base station control unit in the mobile communication network, and
the second base station control unit that received the notice sends the notice of the congestion information to mobile terminals under the second base station control unit based on control performed by the second base station control unit so that users of the mobile terminals can recognize the congestion state.

4. The congestion control method according to claim 1, wherein
the base station control unit that recognized the congestion state inquires other base station control unit that controls a neighboring area in the mobile communication network about their congestion states, and
when the notice of the congestion information is sent to the mobile terminal, the notice includes congestion information of cells neighboring the cell that covers the mobile terminal.

5. The congestion control method according to claim 1, wherein
the base station control unit that recognized the congestion state manages the congestion state by the cell, and
when the notice of the congestion information is sent to the mobile terminal, a notice of information indicating congestion state of each cell is sent.

6. The congestion control method according to claim 1, wherein when the notice of the congestion information is sent to the mobile terminal, the notice includes an area code so that an address indicating an area of the destination cell is displayed on a screen of the mobile terminal based on a conversion table of the area code and the address that is provided to the mobile terminal.

7. A base station control unit in a mobile communication network, comprising:
a portion that determines whether or not the base station control unit or a base station under the base station control unit or a cell under the base station control unit is in a congestion state, and
a portion that, when the congestion state was recognized, manages the congestion state by the cell, sends a notice to the base station control unit or the base station or a mobile terminal that is located in the cell, which is in the congestion state, about congestion information that is information on the congestion state so that a user of the mobile terminal can recognize the congestion state, determines, for a cell that is not in the congestion state, a priority order of destinations to which mobile terminals under a cell that is in the congestion state are moved in order to get rid of the congestion state in such a manner that the mobile terminals to which the notice of the congestion information should be sent are divided into a plurality of groups, and that the destinations are determined to be different for each of the groups, and sends, when the notice of the congestion information is sent to the mobile terminal, a notice of the destinations of which the priority order is different for each of the groups to the mobile terminals of each of the groups.

8. A base station control unit in a mobile communication network, comprising:
a congestion monitor control portion that determines whether or not the base station control unit or a base station under the base station control unit or a cell under the base station control unit is in a congestion state,
a neighborhood congestion information obtaining portion that obtains congestion information from other base station control unit that controls a neighboring area in the mobile communication network, about whether or not a base station or a cell under the other base station control unit is in a congestion state,
a congestion state management table that records a congestion state of each cell,
a congestion state control portion that updates the congestion state management table based on the determination performed by the congestion monitor control portion and the congestion information obtained by the neighborhood congestion information obtaining portion,
a congestion state edit control portion that decides based on the congestion information of the congestion state management table that is updated by the congestion state control portion, for mobile terminals that are under the base station control unit and are in the congestion state, a priority order of destinations to which the mobile terminals are moved in order to get rid of the congestion state in such a manner that the mobile terminals to which a notice of the congestion information should be sent are divided into a plurality of groups, and that the destinations are determined to be different for each of the groups, and
a communication control portion that sends a notice of information about the congestion information and the destination at least to a mobile terminal that is located in the area under the cell in the congestion state so that a user of the mobile terminal can recognize the congestion state, and that a notice of the destinations of which the priority order is different for each of the groups to the mobile terminals of each of the groups.

\* \* \* \* \*